US012617001B2

(12) United States Patent
Benedetti

(10) Patent No.: US 12,617,001 B2
(45) Date of Patent: May 5, 2026

(54) PLANT FOR TREATING HORTICULTURAL PRODUCTS

(71) Applicant: UNITEC S.P.A., Lugo (IT)

(72) Inventor: Luca Benedetti, Frazione Savarna (IT)

(73) Assignee: UNITEC S.P.A., Lugo (IT)

( * ) Notice: Subject to any disclaimer, the term of this patent is extended or adjusted under 35 U.S.C. 154(b) by 0 days.

(21) Appl. No.: 18/554,906

(22) PCT Filed: Apr. 7, 2022

(86) PCT No.: PCT/EP2022/059302

§ 371 (c)(1),
(2) Date: Oct. 11, 2023

(87) PCT Pub. No.: WO2022/218821

PCT Pub. Date: Oct. 20, 2022

(65) Prior Publication Data

US 2024/0189864 A1 Jun. 13, 2024

(30) Foreign Application Priority Data

Apr. 13, 2021 (IT) ........................ 102021000009185

(51) Int. Cl.
*B07C 5/342* (2006.01)
*B07C 5/36* (2006.01)

(52) U.S. Cl.
CPC .............. *B07C 5/342* (2013.01); *B07C 5/365* (2013.01); *B07C 2501/009* (2013.01)

(58) Field of Classification Search
CPC .... B07C 5/342; B07C 5/365; B07C 2501/009
See application file for complete search history.

(56) References Cited

U.S. PATENT DOCUMENTS

| | | | | |
|---|---|---|---|---|
| 3,730,325 | A | 5/1973 | Goodwin | |
| 9,527,115 | B2 * | 12/2016 | LaRose | B07C 5/342 |
| 2013/0168301 | A1 * | 7/2013 | Dell'Endice | B07C 5/368 209/552 |

FOREIGN PATENT DOCUMENTS

| | | | |
|---|---|---|---|
| CN | 112452784 | A | 3/2021 |
| FR | 2976195 | A1 | 12/2012 |

(Continued)

OTHER PUBLICATIONS

International Search Report for International Application No. PCT/EP2022/059302, dated Jul. 12, 2022, 4 pages.

(Continued)

*Primary Examiner* — Michael Mccullough
*Assistant Examiner* — Kalyanavenkateshware Kumar
(74) *Attorney, Agent, or Firm* — CANTOR COLBURN LLP

(57) ABSTRACT

A plant for the treatment of horticultural products, the plant including at least one line for the handling and treatment of horticultural products, provided at least with
- a system for the discrete conveyance of the horticultural products;
- a detection station, which is configured to acquire information related to at least one parameter of interest of each horticultural product in transit;
- a distribution station, which is configured for the selective conveyance of each horticultural product in transit toward one of at least two separate collection stations, on the basis of commands sent by the electronic element as a function of the information acquired at least by the detection station, The line has at least one expulsion apparatus, which is arranged along the portion upstream of the detection station.

10 Claims, 6 Drawing Sheets

(56) References Cited

FOREIGN PATENT DOCUMENTS

| | | |
|---|---|---|
| JP | H08252544 A | 10/1996 |
| JP | 2017178496 A | 10/2017 |

OTHER PUBLICATIONS

Italian Search Report for Italian Application No. 202100009185, dated Dec. 2, 2021, 7 pages.
Written Opinion for International Application No. PCT/EP2022/059302, dated Jul. 12, 2022, 5 pages.
Australian Office Action for Application No. 2022256718, dated Oct. 31, 2024, 6 pages.
Chilean Office Action for Application No. 2023 - 03034, dated Jan. 9, 2025, 24 pages with translation.

* cited by examiner

PLANT FOR TREATING HORTICULTURAL PRODUCTS

CROSS-REFERENCE TO RELATED APPLICATIONS

This application is a 35 U.S.C. § 371 National Stage patent application of PCT/EP2022/059302, filed on 7 Apr. 2022, which claims the benefit of Italian patent application 102021000009185, filed on 13 Apr. 2021, the disclosures of which are incorporated herein by reference in their entirety.

TECHNICAL FIELD

The present disclosure relates to a plant for treating horticultural products.

BACKGROUND

It is well-known that large companies that deal with the packaging and distribution of fruit and horticultural products in general are now making extensive use of automated plants or lines, configured to perform various treatments in sequence on a specific horticultural product.

In fact, only by entrusting machines and robots with the execution of the various steps of treatment and processing it is possible to meet the requirements of the market, satisfying an ever-growing clientele that is attentive to product quality, without forgetting the need to contain costs.

In greater detail, therefore, plants or lines are widespread which have first of all a loading station, which is fed with unsorted masses of a specific fruit (or other horticultural product), often coming directly from the harvesting fields.

Downstream of the loading station, and after undergoing any preliminary treatments (washing and pre-selection, for example), the horticultural products are transferred one by one towards video cameras or other optical and/or measurement devices, which for each product and by means of special software detect the value assumed by one or more parameters of interest, such as for example color, shape, dimensions, sugar content, ripeness, any rotting, weight, etcetera.

Subsequently, each product thus measured reaches an unloading station, in which adapted apparatuses arranged in sequence can be activated in a mutually independent way by an electronic unit, which supervises the operation of the line or is, in any case, provided with instructions to receive and process the data acquired by the measurement devices mentioned above.

Each apparatus faces, or in any case is functionally associated with, a respective collection container: for each product, the electronic unit automatically activates the appropriate apparatus so that all and only those products for which the measured parameter assumes a certain value (or falls within a certain range of values) accumulate in each container.

Thus, for example all the fruits of the same color, or same weight, or same size, etcetera, accumulate in the various containers in a homogeneous manner.

As shown, the unloading of each product into the most appropriate container is based on the reading performed by the measurement device (be it a video camera or other) and therefore, in the portion of line affected by said device, the products must be handled one by one, by means of discrete accommodation units. Such units may, for example, comprise pairs of rollers arranged side by side to support the product, or cups, trays or pans, or others: in any case, each unit can and must discretely convey the products downstream, accommodating them in predefined positions.

However, this constructive solution is not free from drawbacks.

The accommodation units are arranged and move in alignment and as close together as possible, in order to optimize space occupations. Sometimes, however, an error occurs in the step of sorting and delivery of the products to the accommodation units (typically performed by other apparatuses arranged along the line, fed upstream, as mentioned above, with unsorted masses of products). Therefore, it may occur that between two products correctly placed in the respective adjacent accommodation units a third one is conveyed, placed between the first two and possibly resting on them (or on the adjacent edges of the two adjacent accommodation units).

This is evidently an undesirable event: due to the incorrect positioning, the measurement device will not be able to acquire the data of interest for the respective product; moreover, the presence of the poorly positioned product may compromise the reading of the products close to it, even if they are correctly placed on the respective units. Therefore, there is the risk that the unloading of these products by the electronic unit might be based on an incorrect reading and/or it is necessary to provide systems capable of detecting the missed or incorrect reading and then activate a rejection or reprocessing procedure, in any case with a consequent reduction in line productivity.

SUMMARY

The aim of the present disclosure is to solve the problems described above, by providing a plant for treating horticultural products that is capable of managing in an effective and prompt manner the presence and conveyance of poorly positioned products.

Within this aim, the disclosure provides a plant that ensures high productivity and a minimal percentage of products to be reprocessed, if one or more products end up in an incorrect position along the line.

- the disclosure also provides a plant that adopts suitable countermeasures to prevent that poorly positioned products can compromise the reading by the measurement and/or vision devices.
- the disclosure further provides a plant that ensures high reliability in operation.

The disclosure provides a plant that uses a technical and structural architecture that is alternative to those of plants of the known type.

Not least object of the disclosure is to provide a plant that can be obtained easily starting from commonly commercially available elements and materials.

Yet another advantage of the disclosure is to provide a plant that has low costs and is of assured application.

This aim and these and other advantages which will become better apparent hereinafter are achieved by providing a plant according to the independent claim.

BRIEF DESCRIPTION OF THE DRAWINGS

Further characteristics and advantages of the disclosure will become better apparent from the description of a preferred but not exclusive embodiment of the plant according to the disclosure, illustrated by way of non-limiting example in the accompanying drawings, wherein.

DETAILED DESCRIPTION OF THE DRAWINGS

Figure 1:
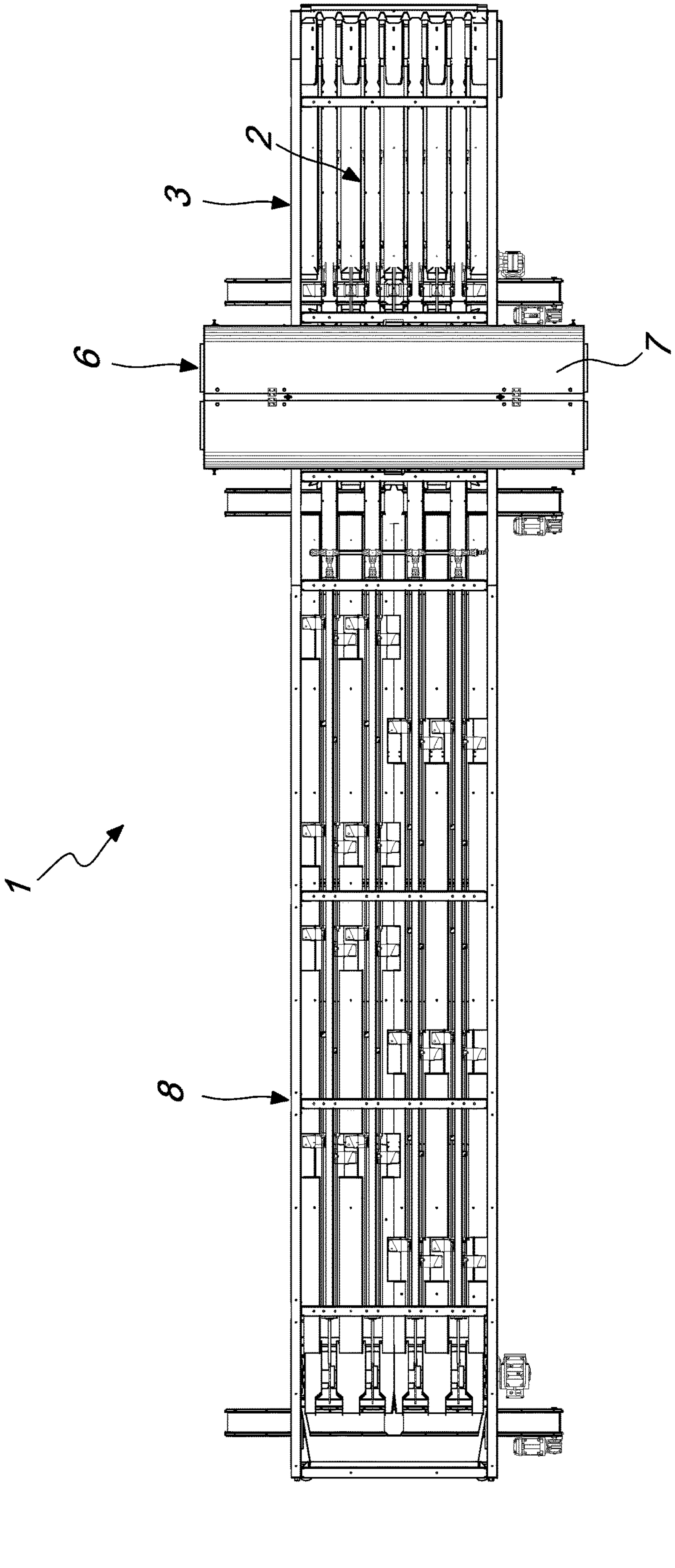
FIG. 1 is a top view of the plant according to the disclosure.

With reference to the figures, a plant for treating horticultural products A is generally designated by the reference numeral 1.

The protective scope claimed herein extends to the use of the plant 1 for treating any horticultural product A (fruits, garden produce, vegetables, etcetera): in fact, as will be clear below, the particularities of the disclosure and in general the specifications of the plant 1 are independent of the specific type of horticultural product A involved.

Furthermore, although typically the plant 1 is designed and used for the treatment of a single horticultural product A, the possibility is not excluded that it might be loaded simultaneously with two or more types of product A or that it might be converted to a different product A after its installation and its first use.

In the preferred (but indeed not exclusive) application, the product A is a fruit and in any case has small dimensions and a low weight: it can therefore be a cherry, a blueberry, a hazelnut, or the like; as will become better apparent hereinafter, the particularities of the disclosure are enhanced in these cases indeed.

The apparatus 1 comprises therefore, first of all, at least one line 2 for the handling and treatment of the horticultural products A, typically fed by a loading station, in turn chosen of a per se known type (and therefore not shown in the accompanying figures).

Here, the term line 2 means an orderly succession of devices and stations that cooperate for the execution of a series of tasks (in this case related indeed to the processing and handling of the products A). Equivalently, the line 2 identifies or corresponds also to the ideal direction of advancement of the products A, from upstream to downstream, defined indeed by the devices that are in charge of handling.

Feeding at the loading station (which may or may not be considered part of the line 2 and of the plant 1) can occur in any manner and the equipment with which the loading station is provided may be any, indeed depending on the feeding methods and the requirements imposed by the specific application context (and by the specific type of product A processed in particular).

For example, the loading station may comprise conveyor belts or trays, onto which the products A are poured from crates that arrive from the harvesting fields or in which in any case the products A have been accumulated beforehand in an unsorted manner. Immediately downstream of the loading station, the line 2 may provide stations for sorting, pre-calibration, washing, or others according to the requirements.

Figure 2:
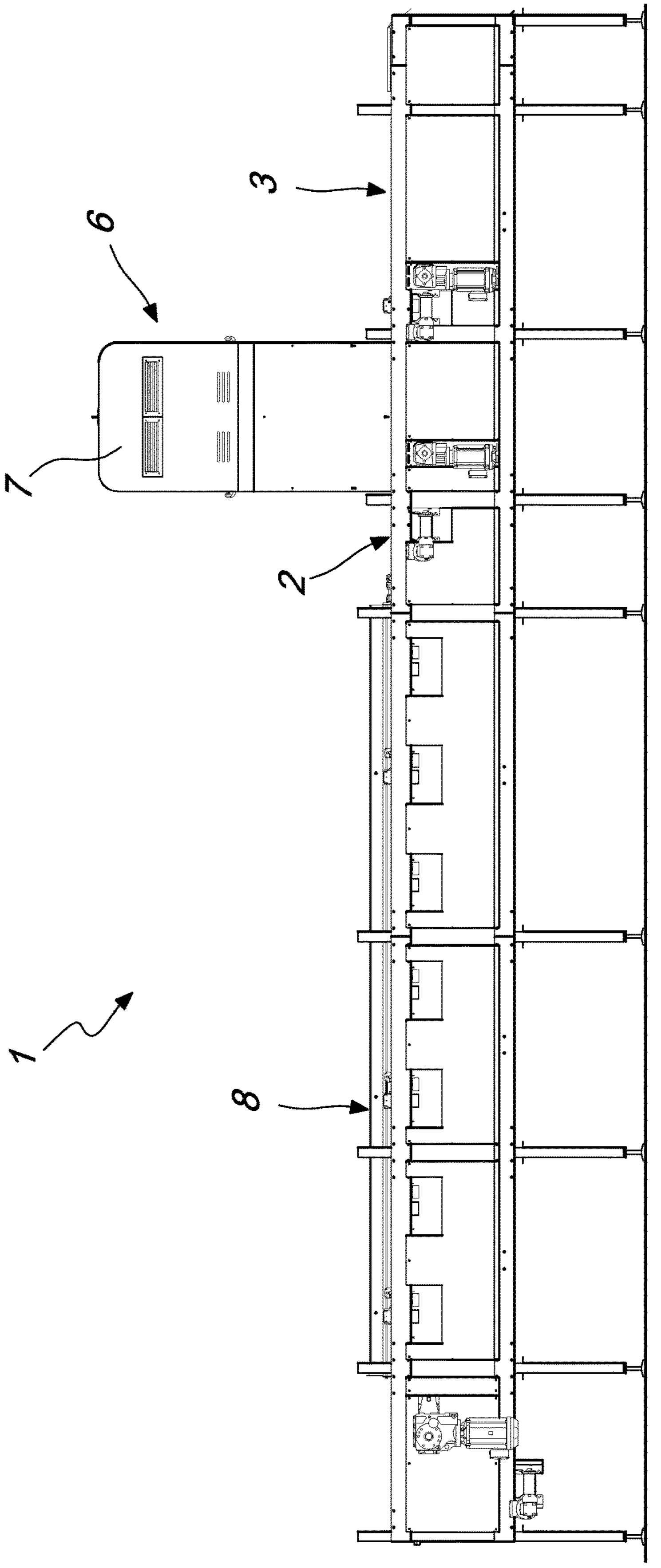
FIG. 2 is a lateral elevation view of the plant of FIG. 1.

It is specified that in this description the terms "upstream", "downstream", "upstream of" and "downstream of" are used according to common usage and refer to the direction of movement of the products A along the line 2 (from right to left in FIGS. 1 and 2), from the loading station to the end sections, which will be described hereinafter.

The line 2 is provided at least with one system 3 for the discrete conveyance of the horticultural products A, which operates along at least one portion of said line 2 and comprises a plurality of discrete accommodation units 4, which can move in a cyclic manner along the portion and are configured for the conveyance in respective predefined positions of corresponding products A. Typically each unit 4 conveys one and only one product A in a respective predefined position, although it is possible to provide that each unit 4 conveys multiple products A in a matching number of predefined positions.

The discrete accommodation units 4 may be any, chosen in various manners also among the solutions known in the field; as a function of the specific type used and of the method with which they convey the product A, the predefined position is in any case identified automatically, since it depends indeed on the type and shape of the unit 4 chosen.

In particular, in the preferred solution each unit 4 comprises a resting seat for the respective horticultural product A, and indeed the seat defines the corresponding predefined position. The products A are therefore simply rested on the units 4 and this enhances the particularities of the disclosure, as will become better apparent hereinafter.

Figure 3:
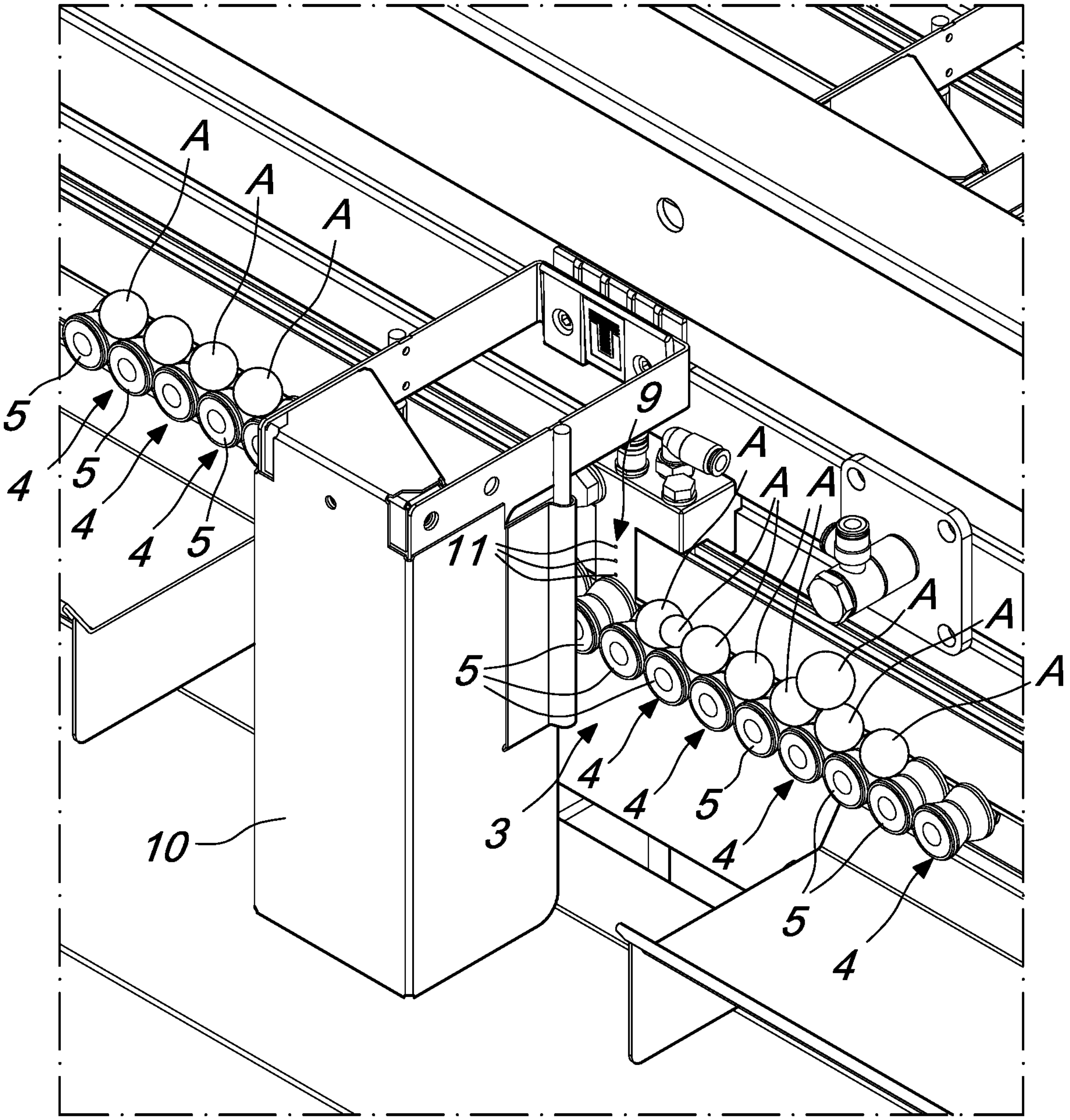
FIG. 3 is a highly enlarged-scale perspective view of a detail of the plant of FIG. 1, which shows the expulsion apparatus.

Even more particularly, in the solution shown by way of example in the accompanying figures, the system 3 comprises a plurality of aligned rollers 5, moved for example by a chain which imposes on them a closed path which has an active portion that coincides with the cited portion of the line 2. In this solution, the correctly positioned product A is conveyed while it is rested (accommodated) between two adjacent rollers 5, at the interspace between them (as shown by FIG. 3), and the unit 4 can be considered in this case constituted by the resting seat thus defined or in any case by two adjacent rollers 5. The predefined position in this case is indeed the one in which the product A rests between two consecutive rollers 5. Each roller 5 may be part of a single accommodation unit 4 and therefore four consecutive rollers 5 are necessary to define two accommodation units 4 and convey two products A, since a product A will be placed only at one of the two interspaces to the sides of each roller 5. As an alternative (as in the solution shown in FIGS. 3 and 4), the same roller 5 constitutes the first roller 5 of one accommodation unit 4 and the second roller of the previous one: three rollers 5 are sufficient to obtain two accommodation units 4 and convey two products A, since each interspace is utilized for a respective product A.

The accommodation units 4 can be in any case cups, pans or trays, or others, without thereby abandoning the protective scope claimed herein.

It is specified that upstream of the cited portion and of the units 4 there may be an ordered sorting station or any other means of a per se known type, capable indeed of receiving, even in an unsorted manner, the products A and of delivering them one by one to the units 4. On the other hand, it is not excluded to load onto the units 4 the products A already at or directly downstream of the loading station.

Furthermore, the line 2 is provided with at least one detection station 6 arranged along the cited portion of said line 2 affected by the discrete conveyance system 3. The detection station 6 is configured to acquire information related to at least one parameter of interest of each horticultural product A in transit and to transmit said information to an electronic control and management element.

FIGS. 3-6 show indeed a segment of the portion along which the units 4 operate, upstream of the detection station 6.

The manner in which such information is acquired, as well as the specific choice of components and technologies used to provide the detection station 6, can be any according to the requirements.

In a preferred but in any case non-limiting embodiment of the application of the disclosure, the detection station 6 comprises an electronic vision device, configured for the acquisition of the information related to the parameter (or parameters) of interest of each horticultural product A in transit and for the transmission of said information to the electronic element. Such parameter is preferably chosen from color, shape, dimensions, sugar content, degree of ripeness, defectiveness, weight, and the like. As mentioned, provisions are also made to acquire information about two or more parameters, from those above cited or others. For this purpose, the information may be acquired by the same detection station 6 or two or more of them may be arranged along the same line 2, in order to indeed monitor and measure respective parameters of the products A.

As is well-known to the person skilled in the art, there are numerous solutions available on the market which can be adopted for the practical provision of the detection station 6 and of the vision device in particular. Preferably, in any case, the latter comprises one or more video cameras, associated with image processing software, mounted inside a tunnel 7 arranged along the line 2 and crossed by the horticultural products A, which are handled in a discrete manner by the units 4.

The need to convey the products A in a discrete manner and in a predefined position arises precisely from the need to be able to measure, for each of them, the parameters of interest in an automatic manner during their transit.

The electronic control and management element also can be of any type: for example, it can be a control unit or an electronic computer; typically, in any case, it is the same electronic element that controls the operation of the whole plant 1.

Moreover, the line 2 is provided with at least one distribution (and unloading) station 8, which is arranged downstream of the detection station 6 and is configured (even in a per se known manner) for the selective conveyance of each horticultural product A in transit toward one of at least two separate collection stations, on the basis of commands sent by the electronic element as a function of the information acquired at least by the detection station 6.

In greater detail, the electronic element can cross-reference the acquired information with a range of values or a value preliminarily assigned to each station, and consequently identify for each horticultural product A the most appropriate collection position. By means of suitable unloading and conveyance means (chosen of a known type and therefore not shown in the present description) actuated indeed by the electronic element, the horticultural products A are therefore divided into at least two corresponding homogeneous subgroups; for example, in each collection station it is possible to find products A (more or less) of the same color, of the same size, with the same degree of ripeness, etcetera.

According to the disclosure, the line 2 comprises at least one expulsion apparatus 9, arranged along the cited portion of the line 2 along which the units 4 move, upstream of the detection station 6. The apparatus 9 is configured to apply, at least at respective predefined instants, a pushing action toward an area that is different from the predefined positions and is normally free from products A, at least at said instants, so as to be able to forcedly unload from the units 4 (from the system 3) any poorly positioned products A that might be present in said area. The term "normally" refers to the condition in which the products A are correctly arranged in the predefined positions.

This allows to achieve the intended aim, since the apparatus 9 automatically expels poorly positioned products A before they can reach the detection station 6 and preventing them from compromising the readings of said station.

As will become better apparent hereinafter, the area towards which the pushing action is directed is free of products A at all times (since it is outside the trajectory imposed on each product A by the units 4), and likewise the area may be chosen between two products A and therefore be normally free of products A only at the specific moment (or in the specific moments) in which the pushing action is generated. The actuation of the apparatus 9 and the generation of the pushing action in this case is conveniently synchronized with the advancement of the products A.

Figure 4:
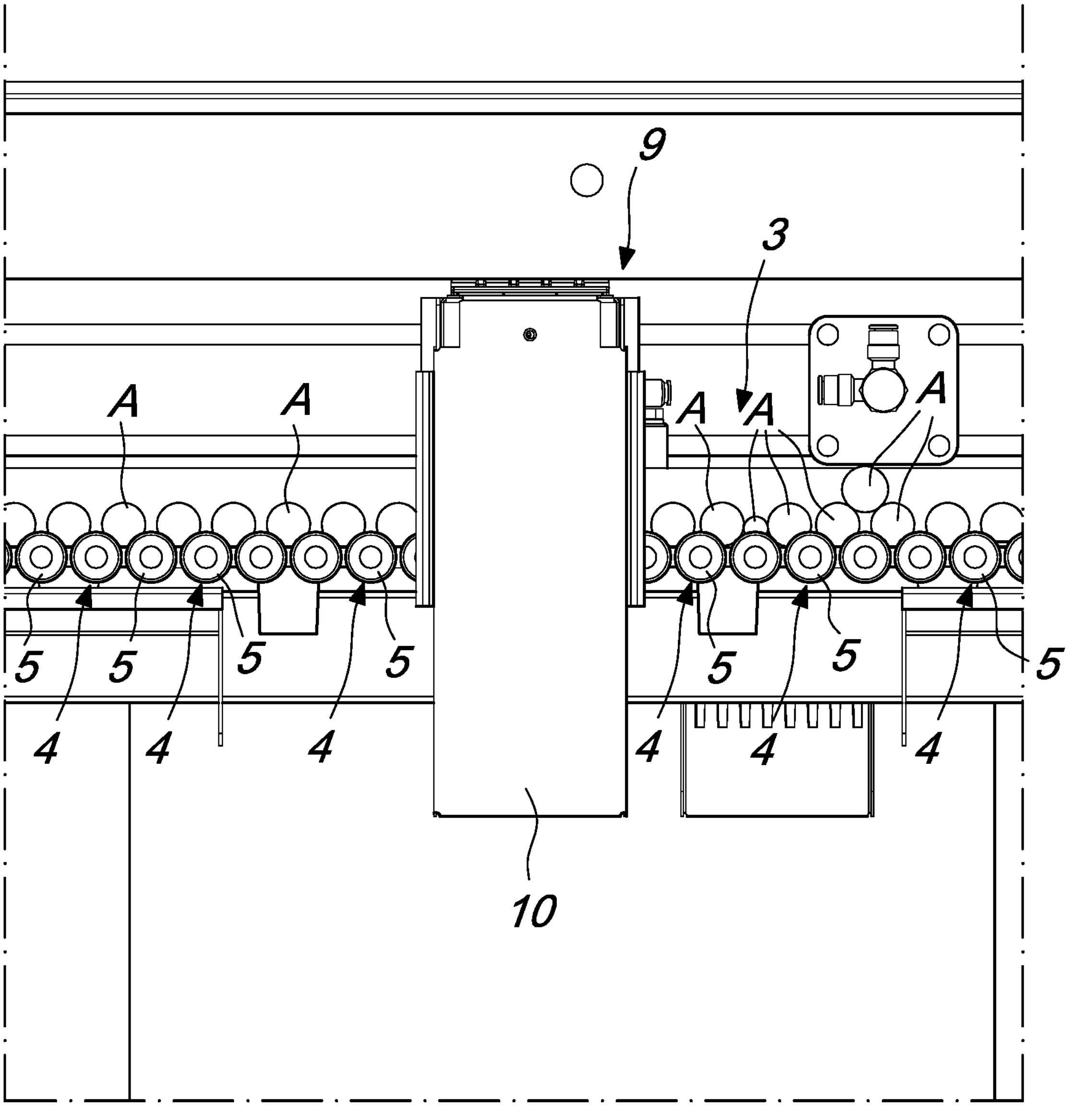
FIG. 4 is a lateral elevation view of the detail of FIG. 3.
Figure 5:
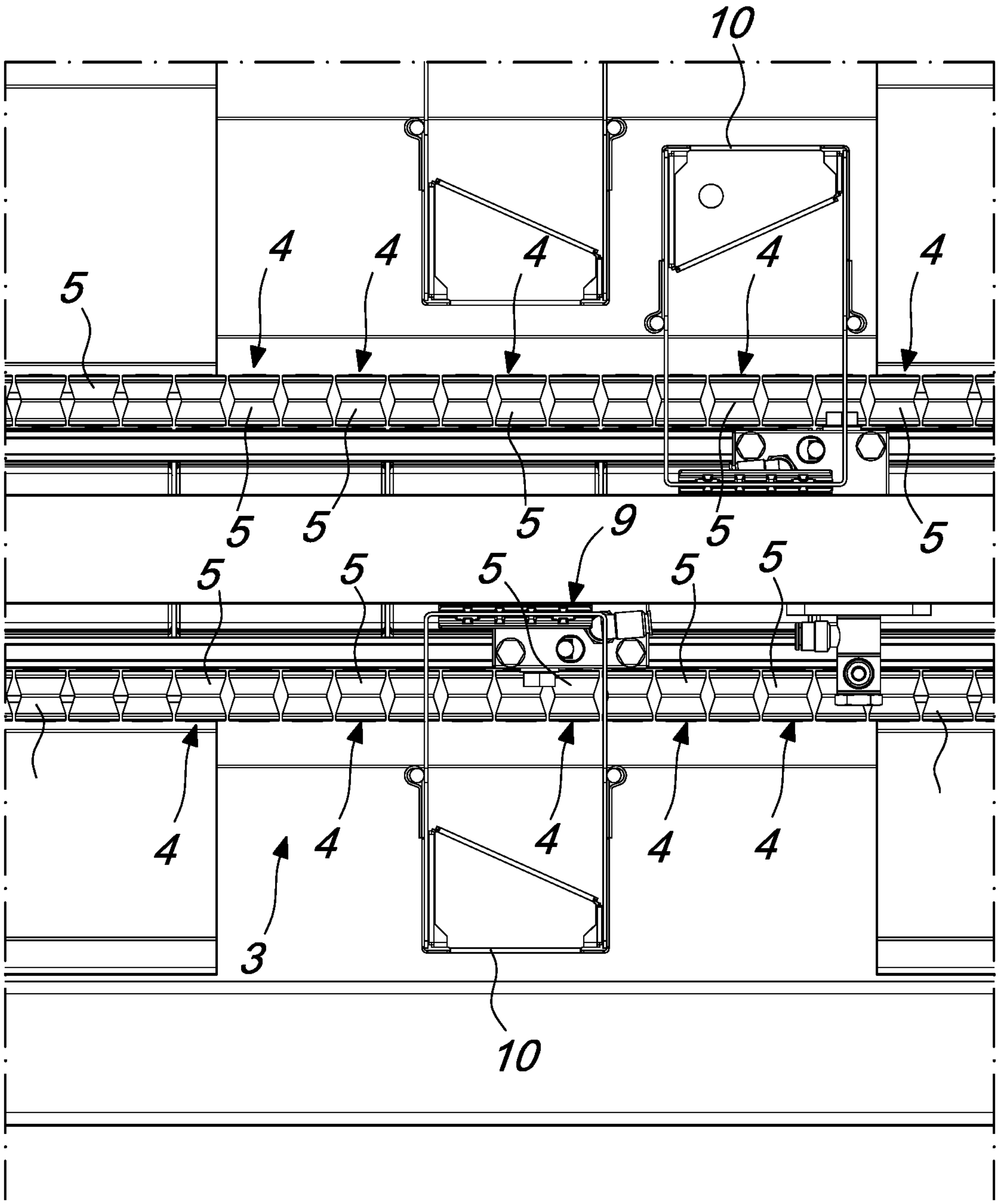
FIG. 5 is a top view of the detail of FIG. 3.
Figure 6:
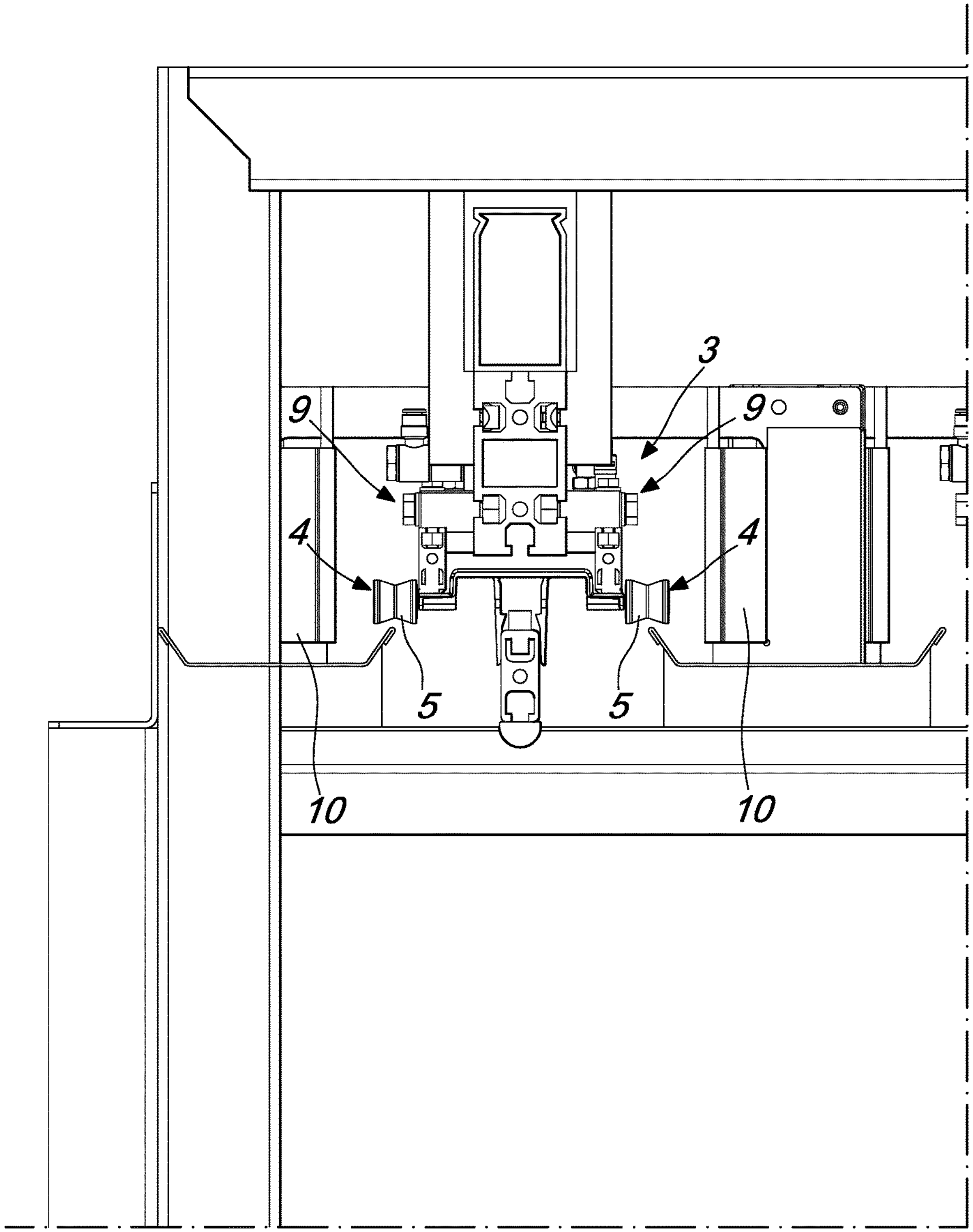
FIG. 6 is substantially a sectional view of a portion of the plant of FIG. 1, showing the detail of FIG. 3 from the front.

It should be noted that FIGS. 3-4 (and, for the sake of simplicity, only these figures) indeed show some horticultural products A arranged correctly in the predefined positions (resting between two rollers 5) and two additional poorly arranged products A: a product A incorrectly rested on two other consecutive products A and a product A incorrectly interposed between two other correctly arranged products.

It is specified that the action generated by the apparatus 9 produces a push that is sufficient to make the struck product A fall from the unit 4: in this sense, as mentioned in the previous pages, preferably but not exclusively the products A are only rested on the unit 4, so that a push of low intensity is sufficient for the fall and expulsion from the units 4. In order to control said fall, facilitating moreover the conveyance of the expelled products A toward a belt which handles their recirculation (or similar means intended in any case to bring said products A back to the beginning of the line 2), a containment screen 10 is arranged laterally adjacent to the units 4 (or in any case on the opposite side of the apparatus 9 with respect to said units 4 and the products A).

A single apparatus 9 or more than one apparatus, located in different points of the line 2 (of the cited portion along which the units 4 move, upstream of the detection station 6) and optionally capable of generating pushing actions directed toward different areas, so as to intercept and expel poorly positioned products A according to different configurations, are arranged.

In the preferred embodiment, which in any case is cited herein by way of non-limiting example of the application of the disclosure, the apparatus 9 comprises at least one pressurized fluid dispenser, configured for the permanent or cyclic generation of a jet directed toward the area.

In particular, the dispenser comprises at least one nozzle 11 (FIG. 3) associated with a respective pneumatic circuit affected by a source of compressed air, which in the preferred solution constitutes therefore the pressurized fluid. In relation indeed to said preferred application, as already mentioned, typically the plant 1 is designed to process small or light fruits (such as blueberries, cherries, hazelnuts, etcetera) or other products A with similar properties, since a jet of low intensity is sufficient to obtain the desired goal. In this regard, moreover, as noted, preferably the products A are only rested on the units 4.

Even more particularly, preferably the dispenser comprises a plurality of nozzles 11, which are mutually aligned along an axis that is perpendicular to the imaginary resting plane of the line 2 (perpendicular to the floor, and therefore vertical) and are arranged laterally adjacent to the transit trajectory of the products A (as indeed in FIG. 3).

In a different, non-limiting embodiment, the apparatus 9 comprises an actuator which can move cyclically, with at least one active portion thereof, along a trajectory affecting the area; at least said active portion is configured to transit periodically in the area at least at the predefined instants, so as to indeed strike any poorly positioned products A present therein, causing their fall from the units 4.

The actuator can be for example a small cylinder provided with translational motion transversely to the trajectory traced by the products A.

In a first embodiment of the disclosure, the area toward which the pushing action generated by the apparatus 9 is directed corresponds to a region of space that is adjacent to the transit trajectory of the products A conveyed by the units 4 in the predefined positions.

If the products A normally translate while rested on the units 4, or in any case while they are retained by them, defining a rectilinear trajectory, evidently no product A should normally be present above such trajectory (at a vertical level greater than that of the predefined positions in which they are expected to be) or laterally adjacent thereto. In such embodiment, therefore, the pushing action is directed for example in an area above the trajectory and the predefined positions or laterally adjacent thereto. In particular, in the first case it is possible to intercept products A (such as one of those in FIG. 3) which are incorrectly arranged on top of other products A, causing them to fall as desired.

Since the pushing action in this case is directed toward an area in which the presence of products A is not intended at any time, said action can be generated for example by a jet of air which is kept constant (although it is possible to choose to configure it so that it is intermittent, as a function of the specific requirements). In general, in this case it is possible to generate a constant or periodic/cyclic pushing action (such as the one generated by the movable actuator).

In a different non-limiting embodiment of the disclosure, the area toward which the pushing action generated by the apparatus 9 is directed corresponds to at least one portion of the region of space that is interposed, in each predefined instant, between two predefined positions identified by respective consecutive units 4.

In this case, in other words, the pushing action (be it an air jet or other) is directed between two consecutive products A at the predefined instants, and therefore said action is necessarily intermittent or periodic, since if it were to be kept constant it would evidently affect also the products A correctly arranged in the predefined positions. This choice allows to expel products A that are incorrectly conveyed between two other products correctly arranged in their predefined positions; FIG. 3 shows an example of this case as well.

In the case of an action directed above the trajectory or in the case described in the last paragraph, preferably the pushing action is directed horizontally, transversely to the trajectory of the products A; it could however assume an inclined or even vertical direction (when it has to act between two predefined positions or to the side of the trajectory).

The pushing action might in any case be directed toward other areas and with directions that are different from those illustrated above.

Usefully, the line 2 comprises at least one presence sensor, which is arranged upstream of the apparatus 9; said sensor can be a photocell or other optical device, but other practical solutions are not excluded, as a function of the specific requirements. In any case, the sensor is configured to detect the presence of products A in the area toward which the pushing action of the apparatus 9 is directed. If said sensor comprises or is constituted by a photocell, for example it may be directed directly toward the area or, preferably, upstream, in that region of space in which the poorly arranged product A transits, a few instants before being in the area affected by the apparatus 9. The sensor is associated with a control device of the apparatus 9 (which can coincide with or be part of the electronic element already mentioned), to selectively activate the pushing action as a function of the actual presence of products A in the area. This allows to reduce consumptions, since the air jet or in any case the pushing action exerted by the apparatus 9 are generated only if poorly positioned products A are actually present.

If the sensor is directed toward a region designed to remain free of products A at all times (for example above or laterally adjacent to the trajectory of said products), said sensor may be kept constantly activated. If instead it is directed between two products A, it must instead in turn be timed adequately.

In order to assist the action of the apparatus 9, the line 2 can also comprise a fixed obstacle, which is arranged proximate to said portion along which the units 4 move, laterally adjacent to the transit trajectory of the products A conveyed by the units 4 in the predefined positions. The obstacle can be for example a plate arranged laterally adjacent to the trajectory traced by the products A, which with one flap thereof faces the units 4 and the products A thereon, in order to move and/or cause the fall of any poorly positioned products A.

The operation of the plant according to the disclosure is evident from what has been shown so far.

In fact, it has been already pointed out that at the loading station the line 2 is fed with horticultural products A, in a typically heterogeneous and unsorted manner: downstream of the loading station (and with the optional interposition of the additional stations or equipment deemed appropriate), the system 3 for the discrete conveyance of the horticultural products A operates and comprises units 4 which convey the products A downstream in an orderly manner. During their path, the units 4 cross the detection station 6, which allows to acquire information on each product A in transit (correctly arranged in the predefined position determined by the unit 4). This information is used by the electronic element that is in charge of sending, in the distribution station 8, each product A to the most appropriate collection station, indeed based on the values assumed by the parameters of interest, which are determined by means of the information acquired by the detection station 6.

This allows to separate the products A into homogeneous subgroups, according to the criteria chosen in each instance. Besides this, the products A can undergo other treatments along the line 2, such as washing, selection, visual inspection, etcetera.

In a completely peculiar manner, upstream of the detection station 6 there is an expulsion apparatus 9 which directs an air jet or at least applies a pushing action towards an area in which, in nominal or normal conditions, there should be no product A. Such area is chosen in any case proximate to the predefined positions (between two of them or above/laterally adjacent to the trajectory of the products A, for example) so as to cause the fall or in any case the forced unloading from the units 4 of the poorly positioned products A, preventing them from being able to reach the detection station 6 and compromising the acquisition of information, for the poorly positioned products A and for the adjacent ones. By promptly expelling the poorly positioned products A, the risk that these products might fall from the units 4 afterwards, interfering with the operation of other devices or ending up collected in stations dedicated to products A that have passed the controls or in any case are different for some reason, is also avoided.

The expulsion apparatus 9 therefore allows to achieve the intended aim, since by taking charge of unloading products automatically from the units 4 it is capable of managing in an effective and prompt manner the presence and conveyance of poorly positioned products A. Such poorly positioned products A are effectively intercepted and expelled before they can compromise reading by the measurement and/or vision devices.

The products A that are in an incorrect position are expelled, while those correctly positioned in the respective predefined positions continue their travel undisturbed, since indeed the pushing action exerted by the apparatus 9 is directed in an area that is different than the one occupied by the products A and is chosen so as to make them simply fall from the units 4. Therefore, the detection station 6 is crossed by units 4 carrying only the respective products A in the corresponding predefined positions, thus maximizing efficiency and productivity; only the products A that are actually poorly positioned are made to fall or in any case are unloaded from the units 4, in order to be sent back to the beginning of the line 2 (as mentioned, the adjacent products A are not affected by the action of the apparatus 9): this allows to minimize the percentage of products A to be reprocessed.

The disclosure thus conceived is susceptible of numerous modifications and variations, all of which are within the scope of the appended claims; all the details may furthermore be replaced with other technically equivalent elements.

In the exemplary embodiments shown, individual characteristics, given in relation to specific examples, may actually be interchanged with other different characteristics that exist in other exemplary embodiments.

In practice, the materials used, as well as the dimensions, may be any according to the requirements and the state of the art.

The invention claimed is:

1. A plant for the treatment of horticultural products, comprising at least one line for handling and treatment of horticultural products, provided at least with:

a conveyance system configured to convey the horticultural products, which operates along at least one portion of said line and comprises a plurality of accommodation units which are configured to move in a cyclic manner along said portion, said plurality of accommodation units being configured for conveyance in respective predefined positions of corresponding products at said plurality of accommodation units, a detection station, which is arranged along said portion and is configured to acquire information related to at least one parameter of interest of each horticultural product in transit in said respective predefined positions and to transmit said information to an electronic control, and a distribution station, which is arranged downstream of said detection station and is configured for selective conveyance of each horticultural product in transit toward one of at least two separate collection stations, on a basis of commands sent by said electronic control and management element as a function of the information acquired at least by said detection station, wherein said line comprises at least one expulsion apparatus, which is arranged along said portion upstream of said detection station and is configured to apply, at least at respective predefined instants, a pushing action of only products disposed in an area that are different from said predefined positions toward said area that is different from said predefined positions and is normally free from products, at least at said instants, and which is adapted to apply a forced unloading from said units of any products that might be present in said area that is different from said predefined positions while products correctly positioned in said respective predefined positions are not affected by said expulsion apparatus and continue to be conveyed undisturbed.

2. The plant according to claim 1, wherein said apparatus comprises at least one pressurized fluid dispenser, configured for a permanent or cyclic generation of a jet directed toward said area.

3. The plant according to claim 2, wherein said at least one dispenser comprises at least one nozzle associated with a respective pneumatic circuit affected by a source of compressed air, which constitutes said pressurized fluid.

4. The plant according to claim 3, wherein said dispenser comprises a plurality of said nozzles, which are mutually aligned along an axis that is perpendicular to an imaginary resting plane of said line and are arranged laterally adjacent to a transit trajectory of the products.

5. The plant according to claim 4, wherein said area corresponds to a region of space that is adjacent to the transit trajectory of the products conveyed by said units for accommodation in said predefined positions.

6. The plant according to claim 5, wherein said area corresponds to at least one portion of the region of space that is interposed, at said predefined instant, between two said predefined positions identified by respective consecutive units.

7. The plant according to claim 1, wherein said apparatus comprises an actuator which can move cyclically, with at least one active portion thereof, along a trajectory affecting said area, at least said active portion being configured for periodic transit in said area at least at said instants.

8. The plant according to claim 1, wherein each one of said accommodation units comprises a resting seat for the respective horticultural product, which defines the corresponding said predefined position.

9. The plant according to claim 1, wherein said detection station comprises an electronic vision device, configured for acquisition of said information related to said at least one parameter of interest of each horticultural product in transit and for the transmission of said information to said electronic control and management element, said at least one parameter being chosen from color, shape, dimensions, sugar content, degree of ripeness, defectiveness, and weight.

10. A plant for the treatment of horticultural products, comprising at least one line for handling and treatment of horticultural products, provided at least with:

a system for discrete conveyance of the horticultural products, which operates along at least one portion of said line and comprises a plurality of discrete accommodation units which are configured to move in a cyclic manner along said portion, said plurality of discrete accommodation units being configured for conveyance in respective predefined positions of corresponding products at said plurality of discrete accommodation units, a detection station, which is arranged along said portion and is configured to acquire information related to at least one parameter of interest of each horticultural product in transit in said respective predefined positions and to transmit said information to an electronic control and management element, and a distribution station, which is arranged downstream of said detection station and is configured for selective conveyance of each horticultural product in transit toward one of at least two separate collection stations, on a basis of commands sent by said electronic control and management element as a function of the information acquired at least by said detection station, wherein said line comprises at least one expulsion apparatus, which is arranged along said portion upstream of said detection station and is configured to apply, at least at respective predefined instants, a pushing action of only products disposed in an area that are different from said predefined positions toward said area that is different from said predefined positions and is normally free from products, at least at said instants, and which is adapted to apply a forced unloading from said units of any products that might be present in said area that is different from said predefined positions while products correctly positioned in said respective predefined positions are not affected by said expulsion apparatus and continue to be conveyed undisturbed, and wherein said line comprises at least one presence sensor, which is arranged upstream of said at least one expulsion apparatus and is configured to detect presence of products in said area toward which said pushing action of said at least one expulsion apparatus is directed, said sensor being associated with an actuation device configured to actuate said apparatus, for selective activation of the pushing action as a function of the actual presence of products in said area.

* * * * *